US00RE39187E

(19) United States
(12) Reissued Patent
Randall

(10) Patent Number: US RE39,187 E
(45) Date of Reissued Patent: Jul. 18, 2006

(54) SPURT MINIMIZING DISPENSING STRUCTURE

(75) Inventor: Jeffrey T. Randall, Oconomowoc, WI (US)

(73) Assignee: Seaquist Closures Foreign, Inc., Crystal Lake, IL (US)

(21) Appl. No.: 09/915,132

(22) Filed: Jul. 25, 2001

Related U.S. Patent Documents

Reissue of:
(64) Patent No.: 5,938,087
Issued: Aug. 17, 1999
Appl. No.: 08/877,759
Filed: Jun. 17, 1997

(51) Int. Cl.
*B65D 47/40* (2006.01)

(52) U.S. Cl. ..... 222/547; 222/556; 222/568; 222/571

(58) Field of Classification Search ..... 222/547, 222/556, 568, 571, 211, 212, 213, 215
See application file for complete search history.

(56) References Cited

U.S. PATENT DOCUMENTS

| | | | | | |
|---|---|---|---|---|---|
| 1,050,192 | A | | 1/1913 | Wood | |
| 2,834,519 | A | | 5/1958 | Miller | |
| 2,974,833 | A | | 3/1961 | Heppenstall | |
| 3,091,373 | A | * | 5/1963 | Kirschenbaum | 222/420 |
| 3,100,067 | A | | 8/1963 | Heppenstall | |
| 3,117,701 | A | * | 1/1964 | Stull | 222/543 |
| 3,207,375 | A | | 9/1965 | Bereziat et al. | |
| 3,233,798 | A | | 2/1966 | Abbott | |
| 3,241,731 | A | | 3/1966 | Bright et al. | |
| 3,318,496 | A | | 5/1967 | Ayotte et al. | |
| 3,563,422 | A | * | 2/1971 | Cruikshank | 222/478 |
| 3,833,150 | A | * | 9/1974 | Visser-Patings | 222/109 |
| 3,980,211 | A | * | 9/1976 | Owens | 222/478 |
| 4,427,138 | A | * | 1/1984 | Heinlein | 222/546 |
| 4,583,668 | A | * | 4/1986 | Maynard, Jr. | 222/529 |
| 4,811,871 | A | * | 3/1989 | Wass et al. | 222/477 |
| 5,139,182 | A | * | 8/1992 | Appla | 222/519 |
| 5,141,138 | A | * | 8/1992 | Odet et al. | 222/153.07 |
| 5,219,100 | A | * | 6/1993 | Beck et al. | 222/480 |
| 5,320,260 | A | * | 6/1994 | Song et al. | 222/547 |
| 5,392,938 | A | * | 2/1995 | Dubach | 215/254 |
| 5,454,489 | A | * | 10/1995 | Vesborg | 222/109 |
| 5,497,906 | A | * | 3/1996 | Dubach | 222/23 |
| 5,531,363 | A | * | 7/1996 | Gross et al. | 222/494 |
| 5,558,239 | A | * | 9/1996 | Dubach | 215/235 |
| 5,782,388 | A | * | 7/1998 | De Nervo | 222/546 |
| 5,850,953 | A | | 12/1998 | Dallas, Jr. | |
| 6,003,728 | A | | 12/1999 | Elliott | |

FOREIGN PATENT DOCUMENTS

| | | | | |
|---|---|---|---|---|
| WO | WO 94/20713 | * | 9/1994 | 16/227 |

* cited by examiner

*Primary Examiner*—J. Casimer Jacyna
(74) *Attorney, Agent, or Firm*—Wood, Phillips, Katz, Clark & Mortimer

(57) ABSTRACT

A spurt-resistant spout for a dispensing structure includes (1) an internal tubular portion having a through bore connecting a dispensing orifice of the spout with the interior of the container, and (2) a surrounding wall portion surrounding the tubular portion. The tubular portion and the surrounding wall portion are sized and located so that little or no fluid is retained in and across the spout bore so as to prevent, or minimize, obstruction of the bore.

27 Claims, 2 Drawing Sheets

2
91
93
48
40
86
84
47
92a
46
56A
56
72
72a
60
80
70
70a
58
92b
96
90
85
55
57
94
130
110
118
104
106
108
109
100
126
134
134a
134b
114
124
D

SPURT MINIMIZING DISPENSING STRUCTURE

Matter enclosed in heavy brackets [ ] appears in the original patent but forms no part of this reissue specification; matter printed in italics indicates the additions made by reissue.

CROSS REFERENCE TO RELATED APPLICATION(S)

Not applicable.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

This invention relates to a system for dispensing a product from a container. The invention is especially suitable for a dispensing structure for dispensing high viscosity fluids from a dispensing orifice normally closed by a lid.

BACKGROUND OF THE INVENTION AND TECHNICAL PROBLEMS POSED BY THE PRIOR ART

A variety of packages that include dispensing systems on containers have been developed for household products such as shampoos, lotions, food products and other substances. Such containers typically have a neck defining an open upper end on which is mounted a dispensing closure. The dispensing closure for these kinds of containers typically has a dispensing spout which is covered with a removable lid.

The closure typically has a closure deck or top wall and a depending skirt with an inside bead or thread for attachment to a container. The closure deck includes a dispensing orifice through which a fluid can be dispensed. Depending on the surface tension of the fluid being dispensed through the closure orifice and the coefficient of friction between the fluid and the closure, the fluid tends to cling to the underside of the closure deck and form a layer beneath the dispensing orifice after a dispensing operation. The resulting layer of fluid has a thickness generally dependent on the fluid viscosity.

The lid is typically reclosed to cover the orifice. When the lid is subsequently removed quickly from the closure deck prior to a dispensing operation, the outward movement of the lid has a tendency to immediately cause the fluid in the layer to "spurt", "burp" or otherwise be propelled out of the orifice prior to a controlled, intentional dispensing. The burping of the fluid can cause spatter on the user's band or clothing or dripping on an exterior surface of the container.

It would be desirable to provide an improved dispensing structure wherein a dispensing orifice in a deck is normally closed by a closure lid which is openable away from a closure deck and wherein the dispensing structure is resistant to propelling fluid upon separation of the lid from the deck.

In addition, it is desirable that the improved dispensing structure design function well with a wide range of fluids, including high viscosity liquids and low viscosity liquids. It would also be beneficial if such an improved dispensing structure design could function well with fluids having different surface tension characteristics.

The present invention provides an improved dispensing structure which can accommodate designs having the above-discussed benefits and features.

SUMMARY OF THE INVENTION

According to one aspect of the present invention, a dispensing structure is provided for a squeezable, fluid holding container so as to eliminate or minimize the propelling or spurting of fluid from a discharge orifice of the dispensing structure during removal or disengagement of a lid which normally closes the discharge orifice. The structure includes a body for closing an opening of the container. The body includes a closure deck having a discharge orifice ordinarily closed by a removable lid. Within the body, and extending from the closure deck, is (1) a conduit, such as a tube, surrounding the orifice and forming a flow channel or passage into the orifice, and (2) a surrounding wall structure, such as an outer ring, around the conduit.

In one embodiment, the surrounding wall structure extends deeper into the container than does the conduit, i.e., the conduit extends to a free end which is recessed upwardly from a free end of the surrounding wall structure.

The surrounding wall structure controls the formation of a "meniscus" of a layer of fluid formed within the discharge structure. The "meniscus" is understood to be a convex or concave surface of a column or layer of liquid. The conduit is sized to extend just beyond the meniscus in order to pierce through the layer of fluid, creating an air path from the interior of the container to the exterior of the container. The conduit acts to break the fluid layer that might otherwise form behind the orifice, thus relieving any pressure behind the layer that would tend to cause the product to "burp" or spurt when the lid is quickly opened. The passage within the conduit is sized such that the surface tension of the fluid resists flow into the conduit. Thus, flow into the conduit will only occur when positive pressure is applied to the contents of the container. Reduced interior pressure (i.e., partial vacuum) created by the container panels returning to their normal position after being squeezed, clears the conduit of fluid.

The diameter and height of the surrounding wall structure and the conduit can vary depending on the fluid and the environment. For example, larger diameters and less height differential are anticipated to be advantageous for more viscous fluids than less viscous, thinner fluids due to the shape and size of the formed meniscus.

The surrounding wall structure can be provided in the form of a ring member extending downwardly from the closure deck or can be formed as a part of the surrounding containment wall of the dispensing structure or container.

In another embodiment, the conduit extends into the dispensing structure as far inwardly as the inner end of the surrounding wall.

In both embodiments, the surrounding wall structure serves to encourage a meniscus to form around the conduit so as to minimize or prevent fluid accumulation in the conduit. The surrounding wall structure allows residual fluid to drip down the surrounding wall structure away from the conduit so as to minimize the tendency of the fluid to enter the conduit.

According to the invention, the dispensing structure can include a lid which may be hinged to, tethered to, or completely removable from, the body of the structure.

The dispensing structure of the present invention may be formed as a unitary part of the container. Alternatively, the dispensing structure may be formed as a separate piece which can be subsequently mounted to the container. Such a dispensing structure in the form of a closure can be designed for attachment to the top of the container by means of a threaded engagement or snap-on engagement.

Numerous other advantages and features of the present invention will become readily apparent from the following detailed description of the invention, from the claims, and from the accompanying drawings.

BRIEF DESCRIPTION OF THE DRAWINGS

In the accompanying drawings forming part of the specification, in which like numerals are employed to designate like parts throughout the same.

FIG. 4 shows the dispensing structure mounted on a container.

DESCRIPTION OF THE PREFERRED EMBODIMENT

While this invention is susceptible of embodiment in many different forms, this specification and the accompanying drawings disclose two specific forms as examples of the invention. The invention is not intended to be limited to the embodiments so described, and the scope of the invention will be pointed out in the appended claims.

For ease of description, the dispensing structure of this invention is described in a typical upright position, and terms such as upper, lower, horizontal, etc., are used with reference to this position. It will be understood, however, that the structure may be manufactured and stored in orientations other than the one described.

Figures 1, 2, 3:
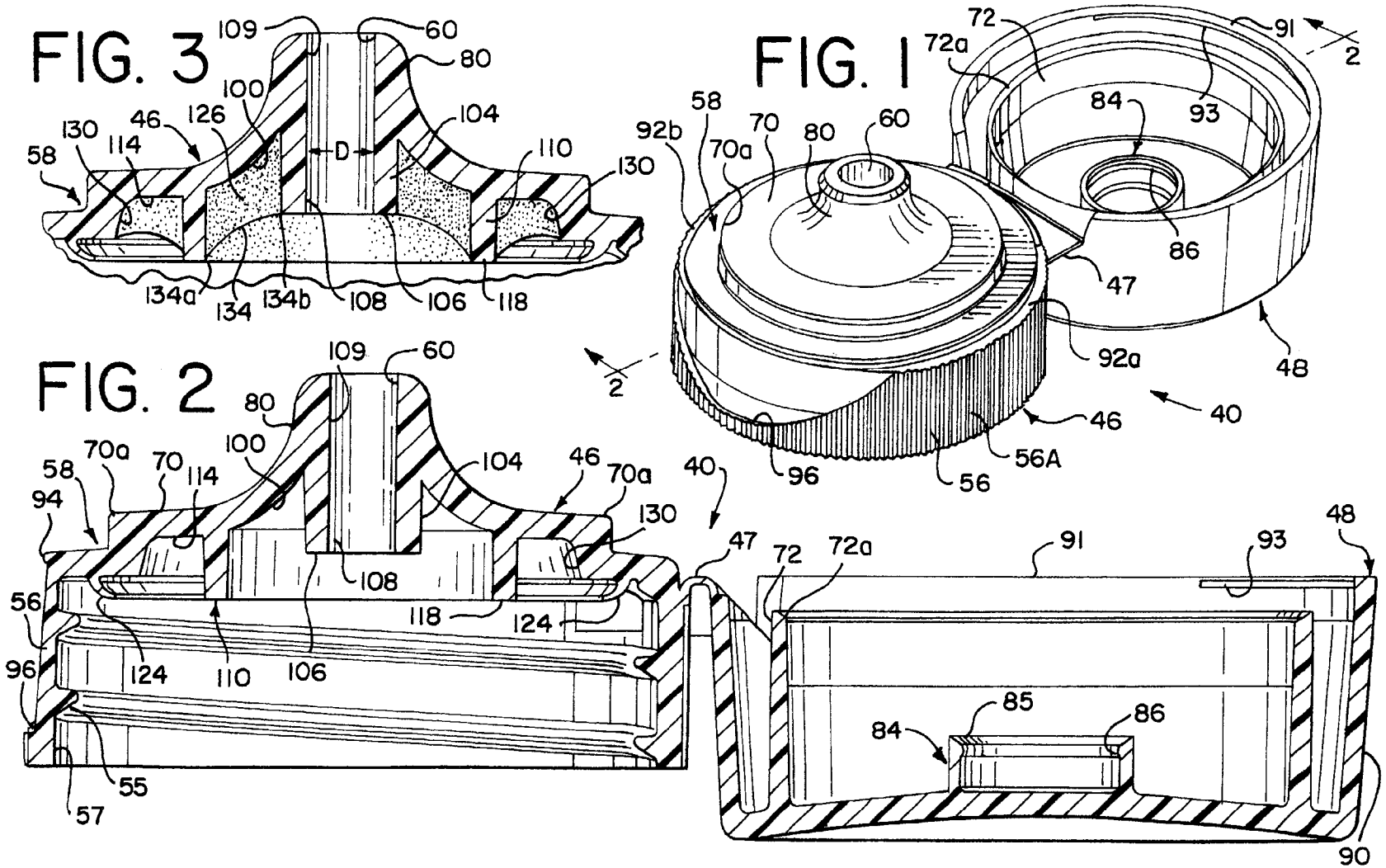
FIG. 1 is a front perspective view of a first embodiment of the dispensing structure of the present invention shown with the lid open.
FIG. 2 is a cross-sectional view taken generally along plane 2—2 of FIG. 1.
FIG. 3 is a fragmentary, cross-sectional view similar to FIG. 2, but FIG. 3 shows an amount of fluid within the dispensing structure.

A first embodiment of a dispensing structure of the present invention is illustrated in FIGS. 1–3 and is designated generally therein by the reference numeral 40. The dispensing structure 40 is provided in the form of a closure 40 which is adapted to be mounted on a container (not illustrated in FIGS. 1–3). The container′ typically has a conventional mouth or opening formed by a neck or other suitable structure. The neck typically has (but need not have) a circular cross-sectional configuration, and the body of the container may have another cross-sectional configuration, such as an oval cross-sectional shape, for example.

The container may be a squeezable container having a flexible wall or walls which can be grasped by the user and compressed to increase the internal pressure within the container so as to squeeze the product out of the container through the closure when opened. The container wall typically has sufficient, inherent resiliency so that when the squeezing forces are removed, the container wall returns to its normal, unstressed shape. Such a structure may be preferred in some applications, but may not be necessary or preferred in other applications. For example, the container may be rigid or substantially rigid and other: means used to cause a dispensing force on the fluid within the container.

With reference to FIG. 1, the closure 40 includes a base or body 46 and preferably includes a lid 48 connected to the base or body 46 with a hinge 47. The lid 48 is adapted to be moved between (1) a closed position (not illustrated) in which the lid 48 is sealingly engaged with the closure body 46 to prevent unintentional dispensing of a fluid from the container to which the closure is mounted, and (2) the illustrated open position in which the lid 48 is disengaged from the top of the closure body to permit dispensing of the liquid through the closure.

Preferably, the hinge 47 is a snap-action hinge formed integrally with the lid 48 and body 46 in a unitary structure. The illustrated snap-action hinge 47 may be a conventional type described in U.S. Pat. No. 4,403,712. Other hinge structures may be employed, including a "floppy" living film hinge. However, it is preferable to employ a snap-action hinge so as to be able to readily maintain the hinge 47 and lid 48 in the open position during the dispensing of the liquid from the container.

The base or body 46 is preferably injectionmolded, along with the hinge 47 and lid 48, from a thermoplastic material compatible with the container contents.

The body 46 includes an annular mounting skirt or lower wall 56. The skirt or wall 56 defines an opening 37 (FIG. 2) which is adapted to receive the container neck and which is adapted to completely encompass the container neck opening.

The wall 56 may have suitable attachment means (e.g., a conventional thread 55 (FIG. 2) or conventional snap-fit bead (not illustrated)) for engaging a suitable container cooperating means, such as a complementary thread or bead on the container neck, to secure the closure body 46 to the container. The closure body 46 and container could also be fixed together by induction melting, ultrasonic melting, gluing, or the like. The closure could also be formed as a unitary part of the container neck.

Formed at the top of the annular mounting skirt 36 is a top wall portion or deck 58. The deck 58 extends racially inwardly over the opening 57 defined by the annular mounting skirt 56. The deck 58 defines a smaller, dispensing orifice 60 located above the opening 57 defined by the mounting skirt 56.

The container and closure 40 may be normally stored in the upright orientation wherein the closure 40 is at the top of the container. The orifice 60 would be above the opening defined by the container neck when the closure 40 is mounted on the container. The closure lid 48 would typically be closed over the body deck 58 when liquid is not being dispensed from the container.

The deck 58 includes a raised platform 70. The lid 48 includes an annular ring 72 having a beveled surface 72a which is adapted to be guided by an edge 70a of the platform 70 when the lid 48 is closed over the body 46. The beveled surface 72a acts to center the lid 48 onto the platform 70 of the body 46.

The deck 58 also includes a spout 80. The spout 80 extends in a smooth, curved transition from the platform 70 *so as to define a continuously curving first sealing surface*. The platform 70 extends outwardly of, and extends continuously around, the spout 80. The orifice 60 extends through an outer end of the spout 80. In order to use the closure 40, the lid 48 is opened to the position illustrated in FIG. 1. Then the container, with the closure 40, mounted thereon, is tilted forwardly and downwardly. Fluid can then be squeezed out of the container through the spout 80 and dispensing orifice 60.

Within the lid 48, and particularly concentrically located within the annular ring 72, is a collar 84 having a beveled lip 85 and an annular seal bead 86 *that defines a continuously curving second sealing surface*. The collar 84 is located such that when the lid 48 is closed to engage the body 46, the *second sealing surface of the* bead 86 sealingly engages the exterior *first sealing* surface of the spout 80.

The lid 48 includes an outer annular wall 90 having a rim 91 which abuts top shoulders 92a, 92b (shown in FIG. 1) of the skirt 56 when the lid 48 is pushed onto the body 46. The lid 48 also includes a rib 93 on a side thereof opposite the hinge 47. The rib 93 establishes a snap-fit engagement with a lip 94 provided on the body skirt 56 when the lid 48 closed over the body 46. As an alternate to the rib and lip arrangement, other interengaging or interlocking formations can be provided on the lid 48 and the body 46 to achieve a mutually engaged configuration. Alternatively, no positive engagement or interlocking of the lid wall 90 to the body 46 need be provided.

The skirt 56 includes a ribbed surface 56a which facilitates a person gripping the body 46 and unscrewing the body from a container (not shown). A crescent shaped recess 96 is included at the front of the body 46 opposite the hinge 47 to accommodate a person's finger or thumb below the lip 94 and rib 93 as the closed lid 48 is pried from the body 46.

As shown in FIG. 2, the spout 80 has an inside surface 100. Extending downwardly from the inside surface 100 is a conduit, such as a tube 104. In the preferred embodiment, the tube 104 has an annular cross-section, although other geometries, such as oval or polygonal cross sections or other surrounding cross-sections, are encompassed by the invention. The tube 104 terminates at a free end 106 defining an inlet orifice 108. The tube 104 merges into the spout 80 and defines a flow passage 109 extending between the dispensing orifice 60 and the inlet orifice 108.

A surrounding wall structure, such as an outer ring 110, surrounds the tube 104 and depends from an inside surface 114 of the deck 58, particularly from the platform 70. The surrounding wall structure 110 in the preferred embodiment has an annular cross-section, but also can have other geometries such as oval or polygonal cross-sections or other surrounding cross-sections.

The surrounding wall structure 110 terminates in a free end 118. The free end 118 of surrounding wall structure 110 extends inwardly toward the container to, a greater extent than does the free end 106 of the inner tube 104. Although the surrounding wall structure 110 is illustrated as an inwardly projecting ring, the invention also contemplates that the surrounding wall structure 110 could be incorporated as a thicker part of the surrounding skirt 56 of the body 46 or of the container (not shown).

An annular lip seal 124 projects from the lower surface of the deck 58 and is resiliently deflected against the upper edge of the container neck, adjacent the container neck opening, so as to provide a leak-tight seal between the closure body 46 and the container neck. The seal 124 surrounds the outer ring 110. Of course, other types of closure body/container seals may be employed.

The tube 104 in cooperation with the outer ring 110 prevents the spout 80 from burping, spurting, oozing, or otherwise propelling fluid through the orifice 60 when the lid 48, particularly the inner seal bead 86, is pulled away from the spout 80. How this works to prevent such spurting can be explained with reference to FIG. 3. FIG. 3 illustrates the condition of the body 46 after a quantity of fluid has been dispensed. Some fluid 126 is retained on the inside surfaces 100 and 114 of the deck 58 between the tube 104 and the outer ring 110 and between the outer ring 110 and an annular, interior side surface 1130 of the deck 58. By locating and sizing the tube 104 and outer ring 110 according to the characteristics of the particular fluid and the environment (such as the ambient atmospheric pressure), the liquid 126 forms an annular meniscus 134 between the outer ring 110 and the tube 104. The meniscus 134 is defined between an outer surrounding edge 134a (on the ring 110) and an inner surrounding edge 134b (on the outer tube 104).

The tube 104 extends at least just slightly beyond the meniscus 134 is order to project through the layer of fluid 126 which clings to the inside surface 108. The inlet orifice 108 is thus open to the interior of the container (not shown), and the passage 109 through the spout 80 is maintained clear of fluid 126.

With reference to FIG. 3, an inside diameter D of the tube 104 is advantageously sized for the particular surface tension of the fluid 126 such that the fluid 126 resists flow into the tube 104. Flow through the tube 104 will only occur when positive pressure is applied, (i.e., when the container is squeezed, or the liquid within the container is urged through the tube 104 by other means). If the container is a squeeze type of container, then a negative pressure or vacuum is temporarily created by the container when the walls of the container return to their normal position after being squeezed. This acts to clear the tube 104 of most, if not all, of the fluid that may have remained in the passage 109.

Diameters and heights of the outer ring 110 and tube 104 will vary depending on the characteristics of the fluid and the environment. For example, larger diameters and less height differential are anticipated to be advantageous for more viscous liquids compared to less viscous liquids owing to the different meniscus effects of the liquids.

Figure 4:
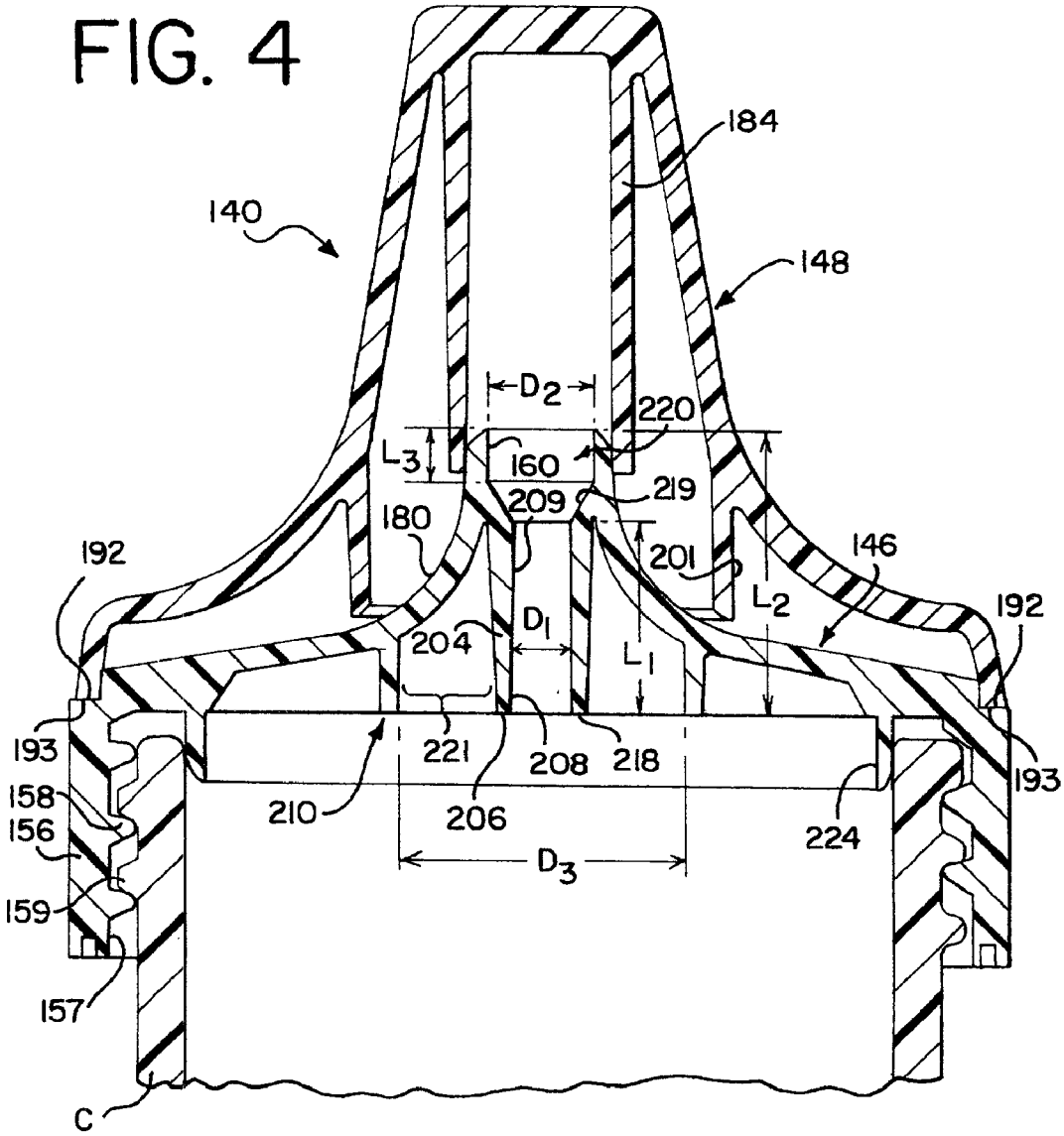
FIG. 4 is a fragmentary, cross-sectional view of an alternate embodiment of the dispensing structure.
Figure 3A:
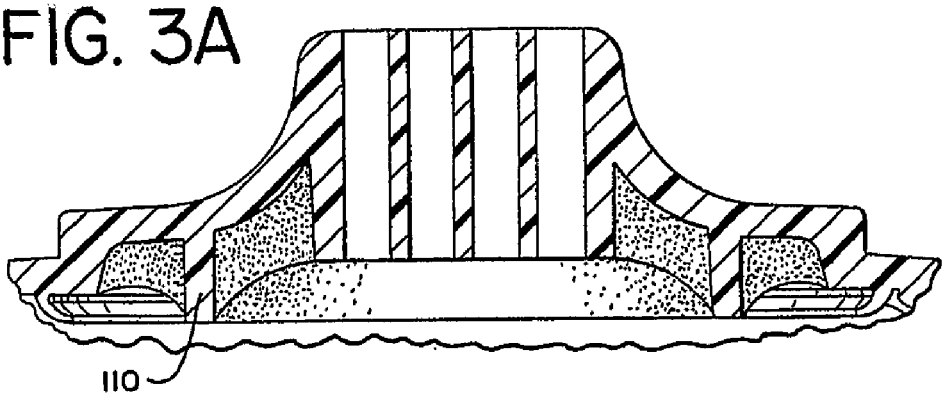

FIG. 4 illustrates an alternate, and presently preferred, embodiment of a dispensing structure in the form of a closure 140 that includes a lid 148 which is shown covering a closure body 146 which in turn is engaged with a container C. The body 146 includes a depending skirt 156. The skirt 156 defines an open area 157 and has an interior thread 158 which co-acts with a thread 159 of the container C to secure the body 156 to the container C.

A dispensing orifice 160 is defined in an outer end of a nozzle 180 which extends radially inwardly from the skirt 156. The nozzle 180 extends from a shoulder 192 defined at the upper periphery of the skirt portion 156.

The lid 148 includes an internal sealing collar 184 for sealing against the nozzle 180. The lid 148 has a bottom surface 193 which fits onto the shoulder 192 when the lid 148 is pushed onto the closure 146.

The lid 148 also includes a centering ring 201 for centering the lid onto the nozzle 180 during installation. A sealing bead or other sealing arrangement (not shown) can be provided on the nozzle 180 or sealing collar 184, if desired.

The nozzle 104 includes a conduit or tube 204 which extends inwardly toward the container C. The tube 204 has a free end 206 defining an inlet orifice 208. The tube 204 defines a passage 209 extending from the inlet orifice 208 to the dispensing orifice 160. A surrounding wall structure 210 extends from the nozzle 180 to a free end 218. The free ends 206 and 218 are preferably located at an equal depth inside the body 146.

The upper end of the tube 204 merges with the nozzle 180 at a frustoconical section 219 which defines a transition from an inner diameter $D_1$ to a larger diameter $D_2$ at the dispensing orifice 160. The larger diameter $D_2$ increases the thickness of the stream of the fluid which is dispensed. This may be advantageous if it is desired to dispense, for example, a wide ribbon of mustard on a hot dog.

The section 219 and larger diameter orifice 160 provide a collection region 220 for any fluid which may flow up the tube 204 after the lid 148 is closed. This provides a larger volume for relieving pressure from behind and around such fluid. This can prevent or minimize such pressure from blowing fluid out of the collection region 220 through the orifice 160 when the lid 148 is subsequently opened.

The tube 204 has a length $L_1$ between the free end 206 and the transition section 219. As the lid 148 is opened, the tube 204 provides a flow resistance along its length $L_1$ to prevent, or at least minimize, the ingress of fluid from the underside of the body 146.

The surrounding wall structure 210 is sized and located to encourage the formation of a meniscus in an annular volume 221 between the surrounding wall structure 210 and the tube 204. Also, the presence of the surrounding wall structure 210 encourages fluid which is held within the annular volume 221 to drip down the inside of the surrounding wall structure 210 rather than down the outside of the tube 204. This removes some dripping fluid from the vicinity of the tube 204 to further prevent or minimize ingress of the fluid into the tube 204 as the lid opens. The total length of the passage 209 is indicated as $L_2$ in FIG. 4. The distance from the orifice 160 to the transition section 219 is designated $L_3$. The surrounding wall structure 210 has an inside diameter designated $D_3$.

According to one embodiment of the invention which is contemplated for use in dispensing yellow mustard, the dimensions are: $D_1$=0.110 inch, $D_2$=0.187 inch, $D_3$=0.50 inch, $L_1$=0.34 inch, $L_2$=0.50 inch, and $L_3$=0.097 inch.

As with the previously described embodiment, the tube 204 and surrounding wall structure 210 can be annular in cross-section or can be oval or another closed geometric shape. Between the skirt 156 and the surrounding wall structure 210 is a plug seal 224 which tightly fits within the container C.

Although no hinge is shown in the embodiment illustrated in FIG. 4, the lid 148 can be connected to the body 146 by a hinge such as shown in FIG. 1, or a tether or other means, or not connected at all.

Figure 3A:
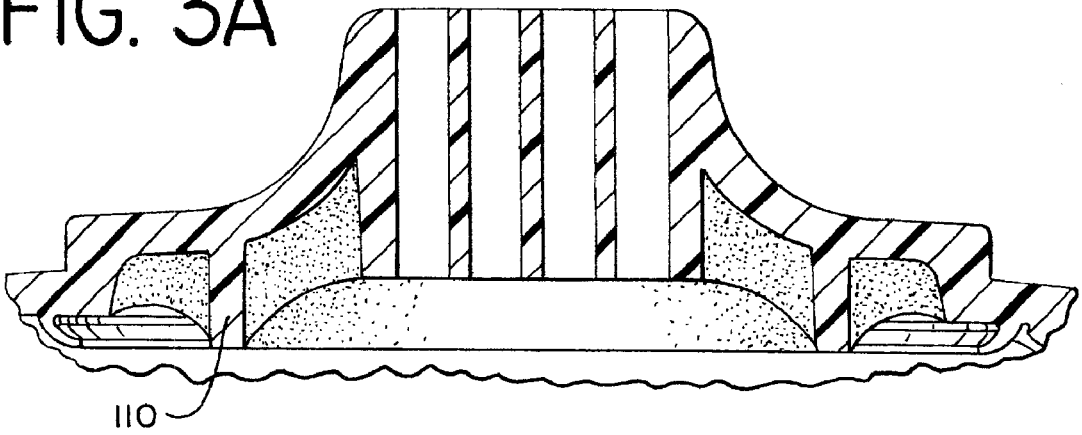
FIG. 3A is a fragmentary, cross-sectional view of an alternate embodiment dispensing structure.

Although in each illustrated embodiment, the closure is illustrated as having only a single dispensing tube (such as tube 104 in FIG. 3), it will be appreciated that more than one tube may be employed in applications wherein that is desired. For example, it may be desirable to employ three or four relatively small diameter tubes within the larger diameter surrounding wall structure 110 shown in FIG. 3A. This has the advantage of accommodating a desirably large dispensing flow. However, because each individual tube has a relative small cross-section, the tendency of the fluid to free-flow into [an] and through the small tubes, when the dispensing pressure is removed, will be significantly minimized, if not eliminated.

It will also be appreciated that the tube or tubes need not have a circular cross-sectional configuration. Other suitable cross-sectional configurations may be employed. For example, the tube or tubes may each have a flow passage (e.g., passage 109 in FIG. 3) which has a polygon cross-section. In one contemplated embodiment, the passage may have a rectangular cross-section which is relatively small in one direction (i.e., the width of the rectangle) and relatively large in the other direction (i.e., the length of the rectangle). This would provide a relatively large amount of surface area in the flow passage relative to the cross-sectional flow area. This would lead to prevent the fluid from free-flowing into and/or through the passage when the dispensing pressure is removed.

It will be readily observed from the foregoing detailed description of the invention and from the illustrations thereof that numerous other variations and modifications may be effected without departing from the true spirit and scope of the novel concepts or principles of this invention.

What is claimed is:

1. A spurt-resistant dispensing structure, for dispensing a viscous fluid comprising:

a body for extending from a container substantially closing an opening thereof, said body having a wall portion with a spout having a dispensing orifice therethrough for dispensing fluid at least partially contained by said body, said wall portion having an inside surface for forming a meniscus of the viscous fluid thereon;

said body including a conduit having a passage in fluid communication with said orifice and extending from an inside surface of said wall portion in a direction away from said spout to a first free end, said passage having a substantially constant open area along a length thereof between said inside surface to said first free end, said passage being free of obstructions, and having a width dimension of about 0.11 inches;

said body including a surrounding wall structure surrounding said conduit and extending from said inside surface of said wall portion; and a pry-off lid having a collar which seals against an outside of said spout when said lid is mounted on said body.

2. The dispensing structure in accordance with claim 1 wherein said conduit comprises an annular wall having an annular cross-section.

3. The dispensing structure in accordance with claim 1 wherein said wall portion is curved upwardly to said dispensing orifice forming a spout.

4. The dispensing structure in accordance with claim 1 wherein said surrounding wall structure comprises a ring extending from said wall portion to a second free end.

5. The dispensing structure in accordance with claim 1 further comprising a lid sized to fit over said wall portion and close said dispensing orifice when said dispensing structure is not dispensing.

6. The dispensing structure in accordance with claim 1 wherein said surrounding wall structure is surrounded by a seal held within said body and extending from an underside of said wall portion for sealing against a container closed by said dispensing structure.

7. The dispensing structure in accordance with claim 1 wherein said lid is hingedly attached to said body to pivot with respect thereto.

8. The dispensing structure in accordance with claim 1 wherein said conduit has a first diameter and extends a first distance from said wall portion to said conduit first free end;

said surrounding wall structure has a second diameter; and and said first diameter, said second diameter, and said first distance are relatively sized as a function of the viscosity of a fluid to be dispensed by said dispensing structure such that the fluid forms an annular meniscus having an outer edge on said surrounding wall structure and having an inner edge on said conduit.

9. The dispensing structure in accordance with claim 1 wherein said body is a unitary molded element separate from, but attachable to, a container.

10. The dispensing structure in accordance with claim 1 wherein said surrounding wall structure extends downwardly from said wall portion to a second free end thereof, said second free end located at a greater distance from said dispensing orifice than is said first free end.

11. The dispensing structure in accordance with claim 1 further comprising a sealing lip which has a generally tapered profile extending from said wall portion of said body, which surrounds said surrounding wall structure, and which is sized and arranged to seal a container fit into said body.

12. The dispensing structure in accordance with claim 1 wherein said body includes a depending skirt having a thread on an inside of said skirt for engaging a cooperating thread on a container.

13. A spurt-resistant dispensing structure comprising:

a body having a deck portion and a depending skirt portion, said deck portion extending radially inwardly from an edge region of said skirt portion, said body having a spout extending upwardly [from] *relative to* said skirt portion, and said spout having an outer end defining a dispensing orifice;

said body including a tubular portion extending from an inside surface of said deck portion in a direction away from said spout to a first free end and having a passage establishing fluid communication between said dispensing orifice and the interior of said skirt portion;

said body including a surrounding ring portion extending from an inside surface of said deck portion to a second free end and surrounding said tubular portion;

said tubular portion, said deck portion, and said surrounding ring portion together defining an annular recess for holding fluid therein; and a pry-off lid connected to said body, said lid being movable between (1) a closed position to engage said body, said lid having an annular collar arranged to seal around an outside of said spout to close said dispensing orifice of said spout when said lid is mounted on said body, and (2) a pried-off open position permitting dispensing of fluid out of said dispensing orifice.

14. The dispensing structure in accordance with claim 13 wherein said lid comprises:

(a) an inner seal sized to sealingly engage said spout; and (b) a first surrounding wall sized to engage said body radially outwardly of said inner seal.

15. The dispensing structure in accordance with claim 13 wherein said first free end of said tubular portion is recessed toward said deck portion relative to said second free end of said surrounding ring portion.

16. The dispensing structure in accordance with claim 15 wherein said surrounding ring portion has a preselected diameter to hold a volume of fluid which forms an annular meniscus between said surrounding ring portion and said tubular portion, and said first free end of said tubular portion extends past said meniscus such that said tubular portion passage is free of said fluid.

17. The dispensing structure in accordance with claim 13 in which said body includes a plurality of said tubular portions.

18. A spurt-resistant dispensing structure, for dispensing a viscous fluid comprising:

a body for extending from a container substantially closing an opening thereof, said body having a wall portion with a spout having a dispensing orifice therethrough for dispensing fluid at least partially contained by said body, said wall portion having an inside surface for forming a meniscus of the viscous fluid thereon;

said body including a conduit having a passage in fluid communication with said orifice and extending from an inside surface of said wall portion in a direction away from said spout to a first free end, said passage having a substantially constant open area along a length thereof between said inside surface to said first free end, said passage being free of obstructions; and a pry-off lid having a lid portion which seals against an outside of said spout when said lid is mounted on said body, said open area sized to resist flow of the viscous fluid therein when said lid is pried off of said [the] body.

19. The dispensing structure in accordance with claim 18 wherein said open area is defined by a circle having a diameter of about 0.11 inches.

20. The dispensing structure in accordance with claim 19 wherein said conduit has a length between said inside surface and said first free end equal to about 0.34 inches.

21. The dispensing structure in accordance with claim 18 wherein said structure includes a seal bead on said lid portion to seal against said spout.

22. A spurt-resistant dispensing structure, for dispensing a viscous fluid comprising:

a body for extending from a container substantially closing an opening thereof, said body having a wall portion with a spout having a dispensing orifice therethrough for dispensing fluid at least partially contained by said body, said wall portion having an inside surface for forming a meniscus of the viscous fluid thereon; and said body including a conduit having a cylindrical conduit passage of constant open area in fluid communication with said spout, said conduit extending from an inside surface of said wall portion to a first free end, said conduit having a length such that said first free end is located beyond the meniscus; and a pry-off lid having a lid portion which seals against an outside of said spout when said lid is mounted on said body, said open area sized to resist flow of the viscous fluid therein when said lid is pried off of said [the] body.

23. The dispensing structure in accordance with claim 22 wherein said spout has an exterior surface and said lid portion comprises a collar sized to sealingly engage said spout exterior surface.

24. The dispensing structure in accordance with claim 22 wherein said open area is defined by a circle having a diameter of about 0.11 inches.

25. The dispensing structure in accordance with claim 24 wherein said conduit has a length between said inside surface and said first free end equal to about 0.34 inches.

26. The dispensing structure in accordance with claim 22 wherein said spout includes a cylindrical spout passage terminating at said orifice and arranged colinearly with, and communicating with, said cylindrical conduit passage, said cylindrical spout passage being greater in diameter than said cylindrical conduit passage.

*27. A dispensing structure for dispensing a viscous fluid comprising:*

*a body for extending from a container substantially closing an opening thereof, said body having a wall portion with a spout having a dispensing orifice therethrough for dispensing fluid at least partially contained by said body, said wall portion having an inside surface for forming a meniscus of the viscous fluid thereon;*

*said body including a conduit having a passage in fluid communication with said orifice and extending from an inside surface of said wall portion in a direction away from said spout to a first free end, said passage having an open area along a length thereof between said inside surface to said first free end, said passage being free of obstructions; and*

*a pry-off lid having a lid portion which seals against an outside of said spout when said lid is mounted on said body.*

* * * * *

UNITED STATES PATENT AND TRADEMARK OFFICE

CERTIFICATE OF CORRECTION

PATENT NO. : RE 39,187 E
APPLICATION NO. : 09/915132
DATED : July 18, 2006
INVENTOR(S) : Jeffrey T. Randall It is certified that error appears in the above-identified patent and that said Letters Patent is hereby corrected as shown below:

Title page, should be deleted and substitute therefor the attached title page.
In the drawings, Sheet 2 of 2 should be replaced with the attached, new sheet 2 of 2 which contains Fig. 4.

Signed and Sealed this

Eleventh Day of December, 2007

JON W. DUDAS
*Director of the United States Patent and Trademark Office*

(19) United States
(12) Reissued Patent
Randall

(10) Patent Number: US RE39,187 E
(45) Date of Reissued Patent: Jul. 18, 2006

(54) SPURT MINIMIZING DISPENSING STRUCTURE

(75) Inventor: Jeffrey T. Randall, Oconomowoc, WI (US)

(73) Assignee: Seaquist Closures Foreign, Inc., Crystal Lake, IL (US)

(21) Appl. No.: 09/915,132

(22) Filed: Jul. 25, 2001

Related U.S. Patent Documents

Reissue of:
(64) Patent No.: 5,938,087
Issued: Aug. 17, 1999
Appl. No.: 08/877,759
Filed: Jun. 17, 1997

(51) Int. Cl.
*B65D 47/40* (2006.01)

(52) U.S. Cl. ..... 222/547; 222/556; 222/568; 222/571

(58) Field of Classification Search ..... 222/547, 222/556, 568, 571, 211, 212, 213, 215
See application file for complete search history.

(56) References Cited

U.S. PATENT DOCUMENTS

| | | | | |
|---|---|---|---|---|
| 1,050,192 | A | | 1/1913 | Wood |
| 2,834,519 | A | | 5/1958 | Miller |
| 2,974,833 | A | | 3/1961 | Heppenstall |
| 3,091,373 | A | * | 5/1963 | Kirschenbaum ..... 222/420 |
| 3,100,067 | A | | 8/1963 | Heppenstall |
| 3,117,701 | A | * | 1/1964 | Stull ..... 222/543 |
| 3,207,375 | A | | 9/1965 | Berezint et al. |
| 3,233,798 | A | | 2/1966 | Abbott |
| 3,241,731 | A | | 3/1966 | Bright et al. |
| 3,318,496 | A | | 5/1967 | Ayotte et al. |
| 3,563,422 | A | * | 2/1971 | Cruikshank ..... 222/478 |
| 3,833,150 | A | * | 9/1974 | Visser-Patings ..... 222/109 |
| 3,980,211 | A | * | 9/1976 | Owens ..... 222/478 |
| 4,427,138 | A | * | 1/1984 | Heinicke ..... 222/545 |
| 4,583,668 | A | * | 4/1986 | Maynard, Jr. ..... 222/529 |
| 4,811,871 | A | * | 3/1989 | Wass et al. ..... 222/477 |
| 5,139,182 | A | * | 8/1992 | Appia ..... 222/519 |
| 5,141,138 | A | * | 8/1992 | Odet et al. ..... 222/153.07 |
| 5,219,100 | A | * | 6/1993 | Beck et al. ..... 222/480 |
| 5,320,260 | A | * | 6/1994 | Sang et al. ..... 222/547 |
| 5,392,938 | A | * | 2/1995 | Dubach ..... 215/254 |
| 5,454,489 | A | * | 10/1995 | Vesborg ..... 222/109 |
| 5,497,906 | A | * | 3/1996 | Dubach ..... 222/23 |
| 5,531,363 | A | * | 7/1996 | Gross et al. ..... 222/494 |
| 5,558,239 | A | * | 9/1996 | Dubach ..... 215/235 |
| 5,782,388 | A | * | 7/1998 | De Nervo ..... 222/545 |
| 5,850,953 | A | | 12/1998 | Dallas, Jr. |
| 6,003,728 | A | | 12/1999 | Elliott |

FOREIGN PATENT DOCUMENTS

| | | | | |
|---|---|---|---|---|
| WO | WO 94/20713 | * | 9/1994 | ..... 16/227 |

* cited by examiner

*Primary Examiner*—J. Casimer Jacyna
(74) *Attorney, Agent, or Firm*—Wood, Phillips, Katz, Clark & Mortimer

(57) ABSTRACT

A spurt-resistant spout for a dispensing structure includes (1) an internal tubular portion having a through bore connecting a dispensing orifice of the spout with the interior of the container, and (2) a surrounding wall portion surrounding the tubular portion. The tubular portion and the surrounding wall portion are sized and located so that little or no fluid is retained in and across the spout bore so as to prevent, or minimize, obstruction of the bore.

27 Claims, 2 Drawing Sheets

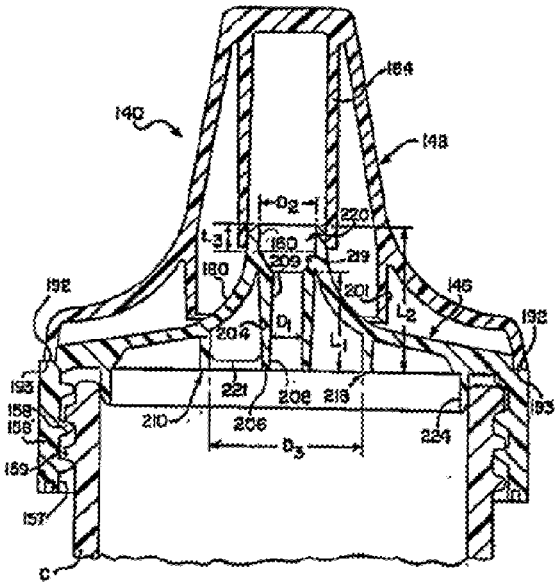

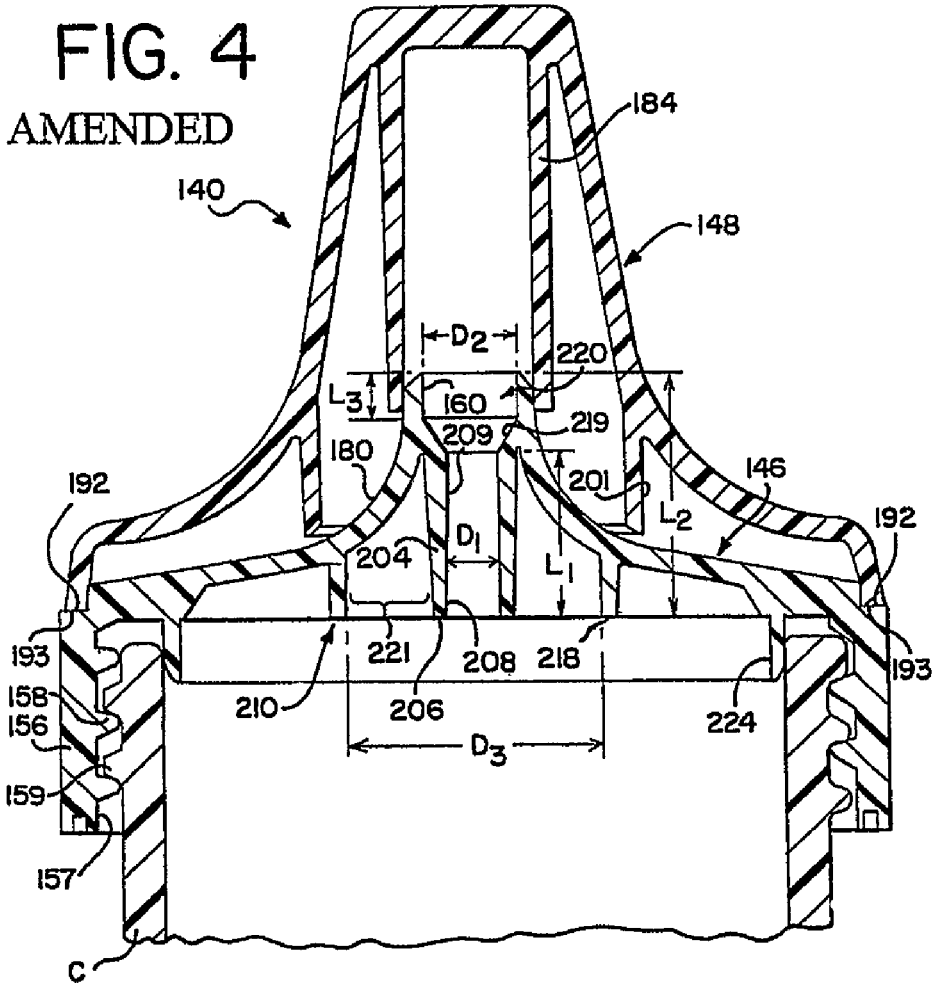

FIG. 4
AMENDED